US012597035B2

(12) United States Patent
Hosseinali et al.

(10) Patent No.: US 12,597,035 B2
(45) Date of Patent: Apr. 7, 2026

(54) SYSTEMS AND METHODS FOR MERCHANT LEVEL FRAUD DETECTION BASED IN PART ON EVENT TIMING

(71) Applicant: STRIPE, LLC, South San Francisco, CA (US)

(72) Inventors: Massoud Hosseinali, South San Francisco, CA (US); Florian Hartl, South San Francisco, CA (US); Efstathios Vafeias, South San Francisco, CA (US); Keagan Long, South San Francisco, CA (US); Stef Nelson-Lindall, South San Francisco, CA (US); Dan Brown, South San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 0 days.

(21) Appl. No.: 18/086,393

(22) Filed: Dec. 21, 2022

(65) Prior Publication Data

US 2024/0211951 A1      Jun. 27, 2024

(51) Int. Cl.
*G06Q 20/40* (2012.01)
*G06N 3/045* (2023.01)
(Continued)

(52) U.S. Cl.
CPC ......... *G06Q 20/4016* (2013.01); *G06N 20/20* (2019.01)

(58) Field of Classification Search
CPC ..... G06Q 20/4016; G06N 20/20; G06N 3/045
(Continued)

(56) References Cited

U.S. PATENT DOCUMENTS 6,226,408 B1    5/2001 Sirosh
9,060,012 B2 *  6/2015 Eisen .................. H04L 63/1408
(Continued)

FOREIGN PATENT DOCUMENTS

WO    2023192473 A1    10/2023

OTHER PUBLICATIONS

Non-Final Office Action received for U.S. Appl. No. 18/086,394, mailed on Dec. 11, 2024, 29 pages.
(Continued)

*Primary Examiner* — Clifford B Madamba
(74) *Attorney, Agent, or Firm* — FINNEGAN, HENDERSON, FARABOW, GARRETT & DUNNER, LLP

(57) ABSTRACT

A method and apparatus for detecting fraudulent merchant activities at a commerce platform system are described. The method may include accessing a first set of merchant system data and encoding the first set of merchant data into a set of structure data input signals. The method may also include accessing a set of time based data associated a set of sequential operation performed at the commerce platform system in response to the merchant system transaction being processed, and encoding the set of time based data into a set of unstructured time-based data input signals. The method may also include inputting the sets of inputs into different machine learning models to generate different machine learning model scores predictive of merchant fraud. The method may further include generating a single merchant fraud score, and in response to detecting that the single merchant fraud score satisfies a fraud detection threshold, initiating one or more remediative actions against the merchant system transaction, the merchant system, or a combination thereof.

19 Claims, 11 Drawing Sheets

(51) Int. Cl.

| | |
|---|---|
| *G06N 20/20* | (2019.01) |
| *G06Q 20/38* | (2012.01) |
| *G06Q 30/018* | (2023.01) |
| *G06Q 30/0601* | (2023.01) |

(58) Field of Classification Search
USPC .......................................................... 705/44
See application file for complete search history.

(56) References Cited

U.S. PATENT DOCUMENTS

| | | | | |
|---|---|---|---|---|
| 11,429,974 | B2* | 8/2022 | Liu ..................... | H04L 63/1416 |
| 11,682,018 | B2* | 6/2023 | Ramesh ................... | G06N 3/08 |
| | | | | 705/75 |
| 11,989,643 | B2* | 5/2024 | Branco .............. | G06Q 20/4016 |
| 2017/0200164 | A1* | 7/2017 | Choi ...................... | G06N 20/00 |
| 2019/0066248 | A1 | 2/2019 | McEachern | |
| 2020/0234154 | A1 | 7/2020 | Ares | |
| 2021/0168166 | A1* | 6/2021 | Liu ........................ | G06N 20/20 |
| 2021/0182830 | A1 | 6/2021 | Edwards et al. | |
| 2021/0241279 | A1 | 8/2021 | Patten, Jr. | |
| 2021/0279731 | A1 | 9/2021 | Agrawal et al. | |
| 2022/0020026 | A1* | 1/2022 | Wadhwa ................ | G06N 3/088 |
| 2024/0013220 | A1 | 1/2024 | Martins | |

OTHER PUBLICATIONS

Non-Final Office Action for U.S. Appl. No. 18/086,387, dated May 2, 2025, 102 pages.
Final Office Action received for U.S. Appl. No. 18/086,394, mailed on Jun. 16, 2025, 21 pages.
Non-Final Office Action received for U.S. Appl. No. 18/086,387, mailed on May 2, 2025, 22 pages.

* cited by examiner

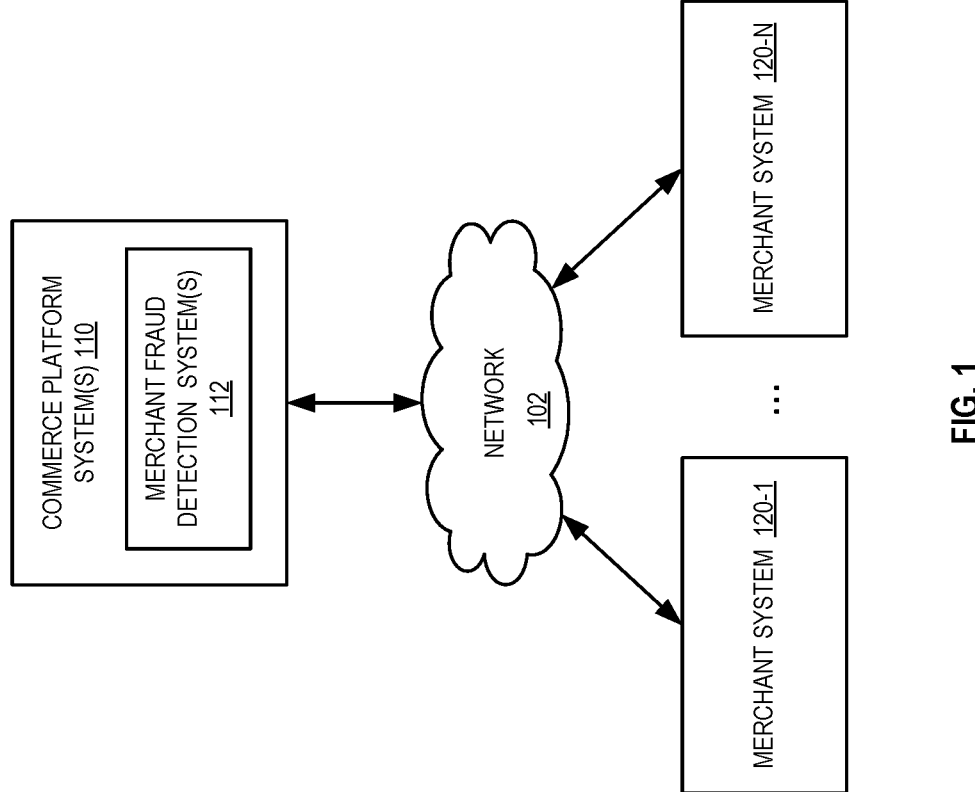
FIG. 1

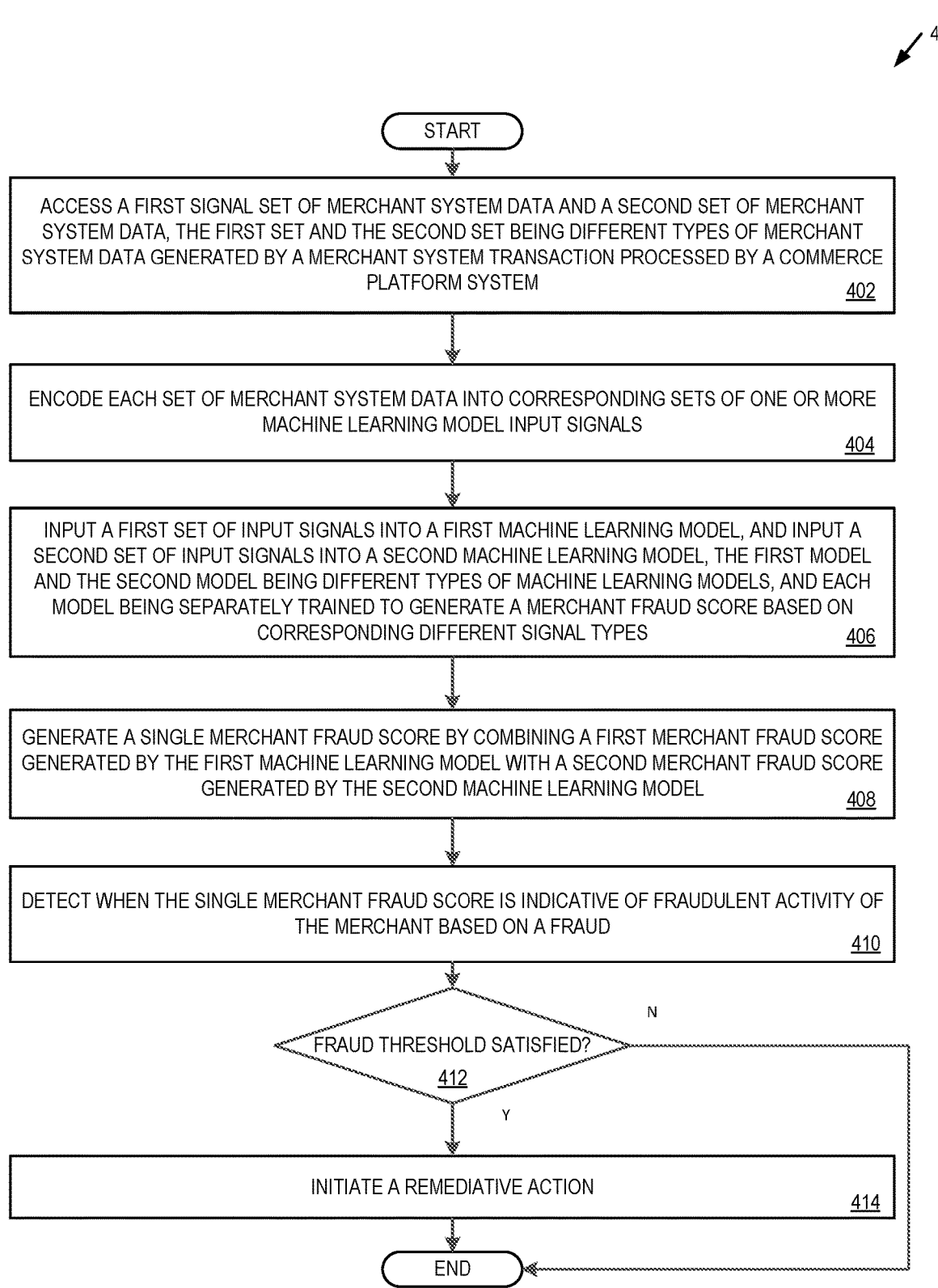

START

ACCESS A FIRST SIGNAL SET OF MERCHANT SYSTEM DATA AND A SECOND SET OF MERCHANT SYSTEM DATA, THE FIRST SET AND THE SECOND SET BEING DIFFERENT TYPES OF MERCHANT SYSTEM DATA GENERATED BY A MERCHANT SYSTEM TRANSACTION PROCESSED BY A COMMERCE PLATFORM SYSTEM
402

ENCODE EACH SET OF MERCHANT SYSTEM DATA INTO CORRESPONDING SETS OF ONE OR MORE MACHINE LEARNING MODEL INPUT SIGNALS
404

INPUT A FIRST SET OF INPUT SIGNALS INTO A FIRST MACHINE LEARNING MODEL, AND INPUT A SECOND SET OF INPUT SIGNALS INTO A SECOND MACHINE LEARNING MODEL, THE FIRST MODEL AND THE SECOND MODEL BEING DIFFERENT TYPES OF MACHINE LEARNING MODELS, AND EACH MODEL BEING SEPARATELY TRAINED TO GENERATE A MERCHANT FRAUD SCORE BASED ON CORRESPONDING DIFFERENT SIGNAL TYPES
406

GENERATE A SINGLE MERCHANT FRAUD SCORE BY COMBINING A FIRST MERCHANT FRAUD SCORE GENERATED BY THE FIRST MACHINE LEARNING MODEL WITH A SECOND MERCHANT FRAUD SCORE GENERATED BY THE SECOND MACHINE LEARNING MODEL
408

DETECT WHEN THE SINGLE MERCHANT FRAUD SCORE IS INDICATIVE OF FRAUDULENT ACTIVITY OF THE MERCHANT BASED ON A FRAUD
410

FRAUD THRESHOLD SATISFIED?
412

N

Y

INITIATE A REMEDIATIVE ACTION
414

END

FIG. 4

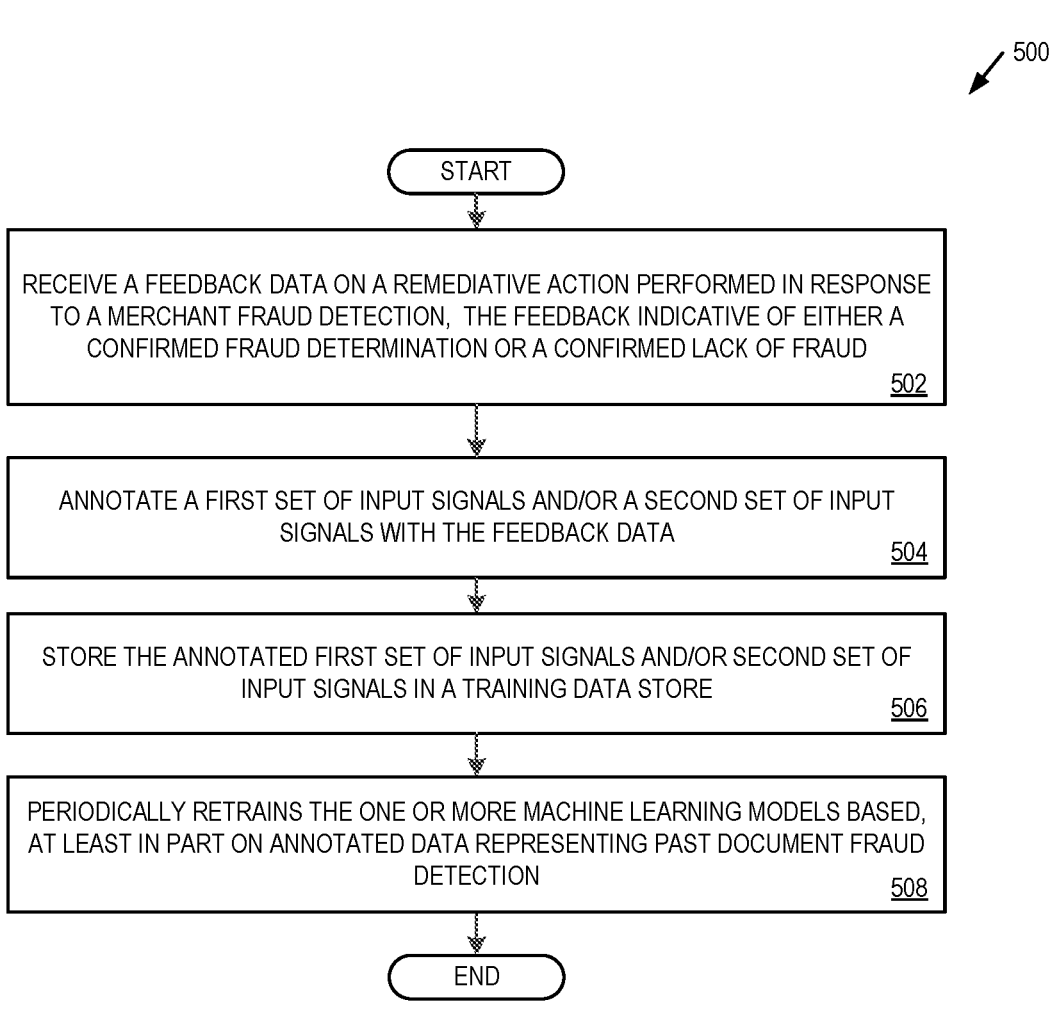

500

START

RECEIVE A FEEDBACK DATA ON A REMEDIATIVE ACTION PERFORMED IN RESPONSE
TO A MERCHANT FRAUD DETECTION, THE FEEDBACK INDICATIVE OF EITHER A
CONFIRMED FRAUD DETERMINATION OR A CONFIRMED LACK OF FRAUD
502

ANNOTATE A FIRST SET OF INPUT SIGNALS AND/OR A SECOND SET OF INPUT
SIGNALS WITH THE FEEDBACK DATA
504

STORE THE ANNOTATED FIRST SET OF INPUT SIGNALS AND/OR SECOND SET OF
INPUT SIGNALS IN A TRAINING DATA STORE
506

PERIODICALLY RETRAINS THE ONE OR MORE MACHINE LEARNING MODELS BASED,
AT LEAST IN PART ON ANNOTATED DATA REPRESENTING PAST DOCUMENT FRAUD
DETECTION
508

END

FIG. 5

SYSTEMS AND METHODS FOR MERCHANT LEVEL FRAUD DETECTION BASED IN PART ON EVENT TIMING

CROSS-REFERENCE TO RELATED APPLICATIONS

This application is related to U.S. patent application Ser. No. 18/086,394, titled "SYSTEMS AND METHODS FOR MERCHANT LEVEL FRAUD DETECTION USING AN ENSEMBLE OF MACHINE LEARNING MODELS", and filed on Dec. 21, 2022, and also related to U.S. patent application Ser. No. 18/086,387, titled "SYSTEMS AND METHODS FOR MERCHANT LEVEL FRAUD DETECTION BASED IN PART ON MERCHANT COHORT CLUSTERING", and filed on Dec. 21, 2022. Each of the aforementioned application is incorporated herein by reference in their entireties.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts to the merchants and/or agents for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

One significant concern with providing such services to merchants and their associated agents is prevention of fraud. That is, fake merchants may establish accounts for the purpose of committing fraud, such as running card cashing schemes, establishing false agents that collect payments for fraudulent purposes, and otherwise obtaining and/or stealing money from parties and systems under false pretenses. Therefore, it is of the utmost importance that the commerce system be able to detect fraud.

Fraud detection of merchants therefore becomes a technical challenge in that merchants typically establish accounts and perform fraudulent actions remotely (e.g., over a communications network). Thus, it may be difficult to detect the difference between a legitimate remote merchant system that establishes an account and processes transactions using the commerce platform, and a fraudulent merchant system that also establishes an account and processes transaction using the commerce platform, where there may be a seemingly substantial similarity of their respective actions. Furthermore, the detection of fraudulent merchants should be accurate so that a sufficiently high percentage of fraudulent merchants are detected as early as possible, without an unacceptable amount of false positives (e.g., identifying a merchant as fraudulent when in fact the merchant is legitimate. Thus the need to accurately detect actually fraudulent merchants from their activities remotely performed over a communications network is a technical challenge that is to be urgently addressed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 1 is a block diagram of an exemplary system architecture for fraudulent merchant detection.

FIG. 4 is a flow diagram of one embodiment of a method for performing merchant fraud detection using an ensemble of machine learning models.

FIG. 5 is a block diagram of one embodiment of a method for a feedback loop for retraining one or more models in an ensemble of machine learning models.

DETAILED DESCRIPTION

Figure 2:
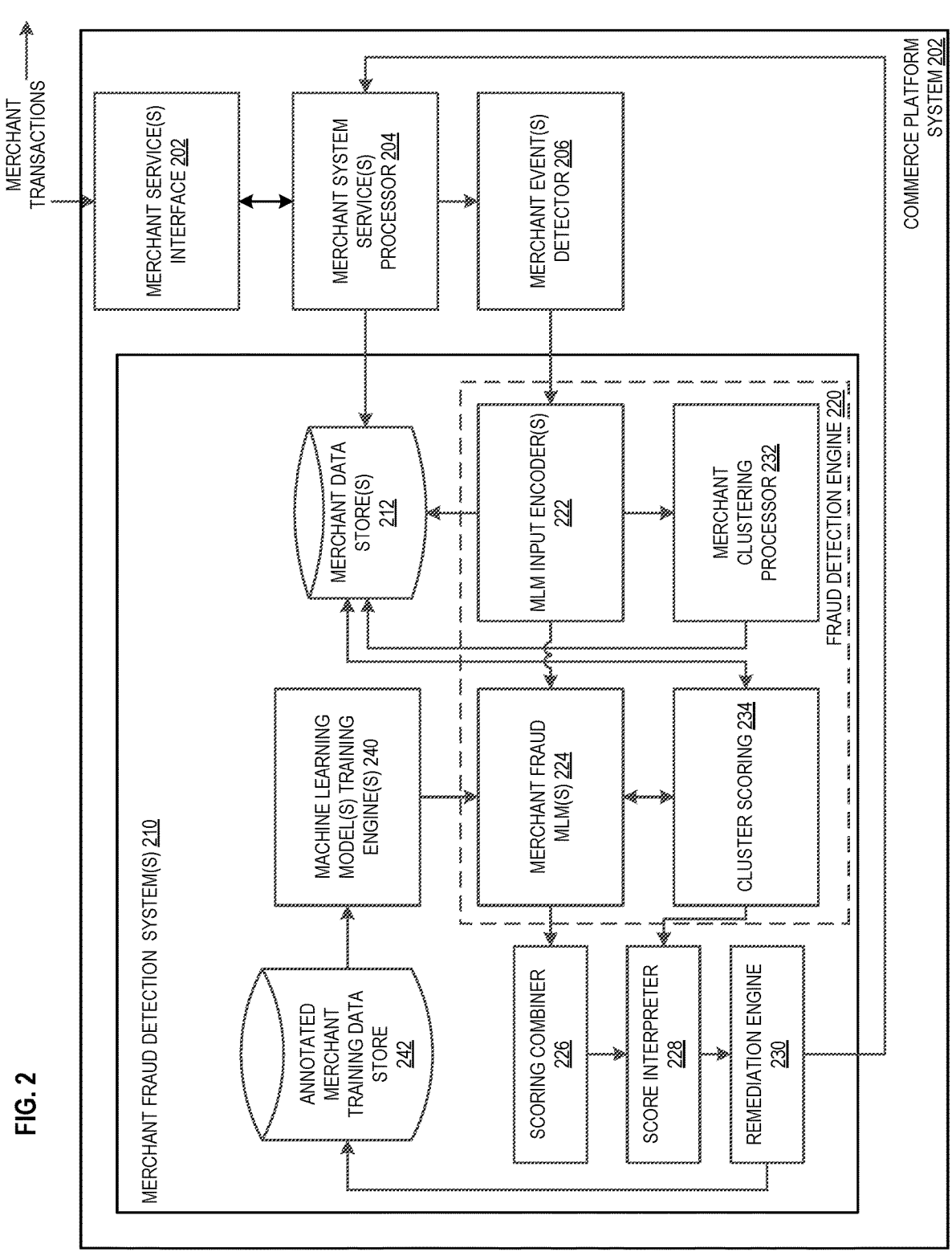
FIG. 2 is a block diagram of one embodiment of a merchant fraud detection system of a commerce platform system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "encoding", "inputting", "generating", "initiating", "calculating", "declining", "deactivating", "sending", "receiving", "annotating", "storing", "retraining", "determining", "suspending", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for fraudulent merchant detection. In one embodiment, the system 100 includes commerce platform system(s) 110 and a plurality of a merchant systems 120-1 through 120-N. In one embodiment, one or more systems merchant systems 120-1 through 120-N may be mobile computing devices, such as a smartphone, tablet computer, smartwatch, etc., as well computer systems, such as a desktop computer system, laptop computer system, server computer systems, etc. The commerce platform system(s)

110 and one or more merchant system(s) may also be one or more computing devices, such as one or more server computer systems, desktop computer systems, etc. Furthermore, there may be any number of merchant systems utilizing the services of the commerce platform system(s) 110. Furthermore, although not shown, each merchant system may be associated with one or more agent systems, which are systems associated with an account of the corresponding merchant system at the commerce platform systems(s) 110, and which are enabled to perform transactions using the commerce platform systems(s) 110 on behalf of the corresponding merchant system. However, to avoid obscuring the present description, only the merchant systems 120-1 through 120-N are illustrated.

Furthermore, it should be appreciated that the fraud detection embodiments discussed herein may be utilized by a plurality of different types of service provider systems, such as other commerce platform system(s) including payment processing systems, card authorization systems, banks, and other service provider systems seeking to identify and detect user system (e.g., merchant system) fraud. Furthermore, any service provider system seeking to identify fraudulent systems seeking to engage and user a the service provider system's services may use and/or extend the techniques discussed herein to identity fraudulent user systems. However, to avoid obscuring the embodiments discussed herein, merchant system fraud detection by commerce platform system(s) 110 is discussed to illustrate and describe the embodiments of the present invention, and is not intended to limit the application of the techniques described herein to other service provider systems for which identification of fraudulent service system user systems is desirable.

The commerce platform system(s) 110 and merchant systems 120-1 through 120-N may be coupled to a network 102 and communicate with one another using any of the standard protocols for the exchange of information, including secure communication protocols. In one embodiment, one or more of the commerce platform system(s) 110 and merchant systems 120-1 through 120-N may run on one Local Area Network (LAN) and may be incorporated into the same physical or logical system, or different physical or logical systems. Alternatively, the commerce platform system(s) 110 and merchant systems 120-1 through 120-N may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchant systems, such as to merchant systems 120-1 through 120-N, as well as merchant agent systems (not shown). For example, commerce platform system(s) 110 may manage merchant accounts held at the commerce platform, run financial transactions from merchant systems and/or agent systems performed on behalf of one of merchant systems 120-1 through 120-N, clear transactions, perform payouts to a merchant system and/or that merchant's agents, manage merchant and/or agent accounts held at the commerce platform system(s) 110, as well as other services typically associated with commerce platforms systems such as, for example, STRIPE™.

In embodiments, the various services provided to the merchant systems 120-1 through 120-N are susceptible to fraud. That is, one or more of the merchant systems 120-1 through 120-N may be a fraudulent merchant which establishes an account at commerce platform system 110, creates accounts for one or more agent system(s) (not shown), processes one or more transactions using the services of commerce platform system(s) 110, etc. for fraudulent purposes. For example, a fraudulent merchant may attempt to perform a card cashing scheme, card testing scheme, running transactions to obtain money from stolen payment instructions, etc. As another example, a fraudulent merchant may seek to perform a distributed attack on the commerce platform system(s) 110 to disrupt and/or deny services of the commerce platform system(s) 110 to other legitimate merchant systems. Other fraudulent transactions and/or actions may be performed by a fraudulent merchant system for any number of nefarious purposes.

In embodiments, one or more fraudulent merchant systems are detected by merchant fraud detection system 112 to identify the fraudulent merchant system(s) and take one or more remediative actions against the fraudulent merchant system(s). As will be discussed in greater detail below, the merchant fraud detection system 112 is a machine learning model based fraud detection system that employs an ensemble of different types of machine learning models to detect various types of fraudulent merchant activities.

In embodiments the ensemble of machine learning models can include a first machine learning model trained to detect fraudulent activities utilizing structured data inputs indicative of merchant transaction data (e.g., a number of charge declines, a total amount charged, a number of accounts associated with a merchant system, a number of accounts established within a specific time period (i.e., last hour, last 24 hours, last week, etc.), a number of charges with a specific time period, etc.), as well as other numeric features associated with a merchant system. In some embodiments, the ensemble of machine learning models can include a second machine learning model trained to detect fraudulent activities utilizing unstructured data, such as text data providing an internet protocol (IP) address associated with a merchant system, a location of the IP address, an email address, a first and last name of the merchant system, country information, as well as other text based features associated with a merchant system. In yet further embodiments, the ensemble of machine learning models can include a third machine learning model trained to detect fraudulent activities utilizing time-based data, such as an identification of commerce platform system application programming interface (API) events and an associated time of the events (e.g., to detect a number of events within a time period, a flow of events, an order of various events, as well as other time based events occurring at the commerce platform system(s) 110 on behalf of a merchant system). Each of these models in the ensemble includes a model for detecting a specific merchant's activities as being indicative of fraud in real-time as they occur based on the properties of the detected activities. Furthermore, the fraud detection is performed at scale for each merchant and each merchant transaction processed by the commerce platform system(s) 110.

In yet further embodiments, the ensemble of machine learning models can include a cohort clustering processor trained to cluster merchant systems into cohort groupings based on sets of attributes associated with a merchant system, transactions of the merchant system, or other attributes (e.g., sets of feature clustering of merchants having a similar volume of transactions, a similar proportion of declines, a similar number of agents, a similar geographic location, and similar merchant system attributes). For example, a clustering technique such as KMeans or density-based spatial clustering may be used to cluster merchant systems based on set of different merchant properties. In embodiments, each cohort cluster may then be scored to predict whether the members of the cluster should be identified as fraudulent. Thus, the cohort clustering and scoring aids in the detection of fraudulent merchants, for example, even when one or more of the above referenced fraud models does not indicate a specific merchant as being fraudulent, but the merchant system is assigned to a cluster that is associated with fraud. Thus, a redundant check is provided by the cohort clustering based fraud detection because additional merchants may be identified based on their characteristics and cluster of cohorts being identified as fraudulent. In contrast to the models above, the clustering, scoring, and ultimate detection of fraudulent cohort clusters may be performed periodically and asynchronously with merchant transactions (e.g., hourly, daily, weekly, etc.) using the transaction and activity characteristics gathered over time to cluster merchant systems with their cohorts, as will be discussed in greater detail below.

Each of the above discussed machine learning models is trained on annotated commerce platform system data (e.g., past transaction data, past onboarding data, past time-based event data, etc.), where the annotation may be generated by a human review process, by a previously machine learning model fraud prediction verified as correct and/or incorrect as part of a feedback loop for retraining one or more machine learning models, or a combination thereof. Furthermore, each of the models is trained utilizing an appropriate iterative training process for the model being trained.

Each of the models and processes discussed above will be discussed in greater detail below including their deployment within the ensemble by the merchant fraud detection system(s) 112, how they are combined for acting as an ensemble within the merchant fraud detection system(s) 112 to detect various types of merchant system fraud, and how each contributes to improved real time and asynchronous merchant fraud detection performed by the merchant fraud detection system(s) 112.

Therefore, in embodiments, a merchant system, such as merchant system 120-N, remotely engages with services provided by the commerce platform system(s) 110 via network 102. For example, merchant system 120-N may establish an account via a web interface of the commerce platform system(s) 110, process transactions via one or more APIs or software development kits (SDKs) distributed by the commerce platform system(s) 110, have agent accounts established and associated with merchant system 120-N, process API and/or SDK based transactions using the agents, etc. These actions are stored by the services of the commerce platform system(s) 110, where the services are responsible for performing the merchant system requested actions, for example in data store(s) of those services. Then, the models discussed herein may input data indicative of one or more characteristics associated with the merchant system, the requested action, or a combination thereof, in-line with a transaction being requested to detect merchant system fraud as the transaction is occurring. When fraud is detected, the transaction can be blocked, a merchant system account can be frozen or suspended, a merchant account can be deactivated, and/or some other remediative action(s) performed by the commerce platform system(s) 110 in real time to prevent the detected merchant system fraud. Furthermore, asynchronously with merchant transactions, transaction and action characteristics data is collected to perform merchant cohort clustering, and cluster fraud scoring, with which one or more of the above remediative actions may be taken against each member of a cohort cluster when the cluster is determined to be a cluster of fraudulent merchant systems.

The remediative actions are communicated from merchant fraud detection system(s) 112 to the effected merchant system, which may contest the fraud determination by providing proof of lack of fraud, insufficiency of data used to detect fraud, or some other form of proof of legitimacy of a transaction or set of transactions. When verified, this proof may be used to annotate training data for retraining one or more machine learning models to further improve the function of those models in detecting fraud. As such, a feedback loop is formed to ensure that usage of the models will result in improved fraud detection accuracy, and improved avoidance of false fraud detections.

In the embodiments discussed herein, the merchant fraud detection system(s) 112 of commerce platform system(s) 110 therefore enables accurate detection of various kinds of fraud perpetrated by remote merchant system(s). The merchant fraud detection system(s) 112 addresses the challenge of how to perform such fraud detection using only the remote interactions, and uses various ensembles of machine learning models and processes trained and deployed as discussed herein to perform both real time and asynchronous fraud detection at scale. Additionally, the machine learning models are retrained over time based in part on feedback from actual fraud determinations to achieve improved fraud detection performance by improving the models used to make the fraud determinations.

FIG. 2 is a block diagram of one embodiment of a merchant fraud detection system 210 of a commerce platform system 202. Merchant fraud detection system 210 and commerce platform system 202 provides additional details for the merchant fraud detection system(s) 112 and the commerce platform system(s) 110 discussed above in FIG. 1.

In one embodiment, commerce platform system 202 a merchant service(s) interface 202, merchant system service(s) processor 204, and merchant event(s) detector 206). In embodiments, the merchant service(s) interface 202 is an API endpoint that receives merchant services messaging for one or more services provided by the commerce platform system 202. For example, the messaging may relate to an onboarding service to establish a merchant system account, a transaction service to process a transaction for a merchant system having an established account, agent system related transactions, and other API based messaging. The API endpoint of merchant service(s) interface 202 passes the message(s) to service(s) processor 204. The service(s) processor 204 may be a collection of distributed services processors, each responsible for a corresponding service. In embodiments, the service(s) processor 204 is responsible for performing one or more actions in response to the merchant services messaging, such as allocating new merchant/agent accounts in data store 212, performing transaction operations (e.g., clearing a transaction, verifying account details, routing payments, communicating with banking or other clearance servers, etc.) and storing results in data store 212, as well as performing other services and storing processing results in data store 212.

In embodiments, a subset of events related to merchant system events are detected by merchant event(s) detector 206. For example, the subset may be events for which merchant fraud is to be detected, such as onboarding events, merchant transaction events, merchant account updates, merchant account capability changes, adding agents to a merchant account, as well as other events. When a relevant merchant event is detected, merchant event(s) detector 206 notifies merchant fraud detection system(s) 210 of the initiation of the event for performing real-time merchant fraud detection.

In embodiments, machine learning model (MLM) input encoder(s) receive the merchant event notification from detector 206, including one or more merchant identifiers, session identifiers, transaction identifier(s), or other identification data. The identification data is used by MLM input encoder(s) 222 to access merchant and transaction data from merchant data store(s) 212. The accessed data corresponds, for example, to transaction and/or merchant characteristics data maintained within merchant data store. For example, the accessed data can include accessing numerical data including transaction amount, number of transactions associated with an identified merchant system that have been processed over a period of time, total amount of transactions associated with an identified merchant system processed over the period of time, charge approval rate of the transactions associated with the merchant system, charge decline rate of the transactions associated with the merchant system, etc. MLM input encoder(s) 222 formats the numerical data as tabular input data provided to merchant fraud MLM(s) 224. In embodiments, the encoders may transform or otherwise format the data into an appropriate format, such as removing decimal point data, combining values, truncating digits, etc. to standardize data placed into the tabular input. As another example, the accessed data can include accessing text data, such an IP address of a transaction, a name of a merchant system, an email address, etc. This textual data may be encoded as unstructured data inputs provided to the MLM input encoder(s) 222 by, for example, transforming text data, combining strings together, using a MLM based transformer (e.g., BERT) to translate words and/or strings to a dictionary of values, etc. As yet another example, the accessed data can include accessing time based event data, such as one or more API based events having time data associated therewith (e.g., read requests, write requests, account change requests, charge requests, etc. each being an API event exchanged between service(s) of the commerce platform system 202 to further a merchant system transaction), the encoders(s) 222 may store event identifiers with time data as indications of the events. This time base API event data is therefore passed as a data set with time data for input to a MLM of the merchant fraud MLM(s) 224.

In embodiments, merchant fraud MLM(s) may contain an ensemble of MLM(s) including a combination of two or more of a structure data analysis MLM (e.g., an XGBoost, or other MLM for processing structured numerical data), an unstructured data analysis MLM (e.g., a deep neural network, a convolutional neural network, other other MLM for processing unstructured data), and a time-based event analysis MLM (e.g., a deep neural network, a convolutional neural network, etc.). In embodiments, each of the MLM(s) are pretrained to detect fraudulent merchant activities. In embodiments, the machine learning model(s) training engine(s) 240 access annotated training data in data store 242. The annotated training data is a set of data having inputs associated with each model (e.g., structured inputs for an XGBoost model, unstructured text data inputs for a text analysis DNN, unstructured time-based event data inputs for a time-based analysis of API events by a DNN, CNN, etc.), and associated merchant fraud determinations. Then, the machine learning model 240 iteratively pretrains (or retrains as discussed below) the ensemble of model(s).

Merchant fraud MLM(s) 224 takes as input the sets of input data, and enters the input data into an appropriate MLM of the ensemble within the merchant fraud MLM(s) 224. The appropriate MLM then generates a fraud score based on the input data. Each MLM in the ensemble passes its fraud score to scoring combiner 226.

Figure 3A:
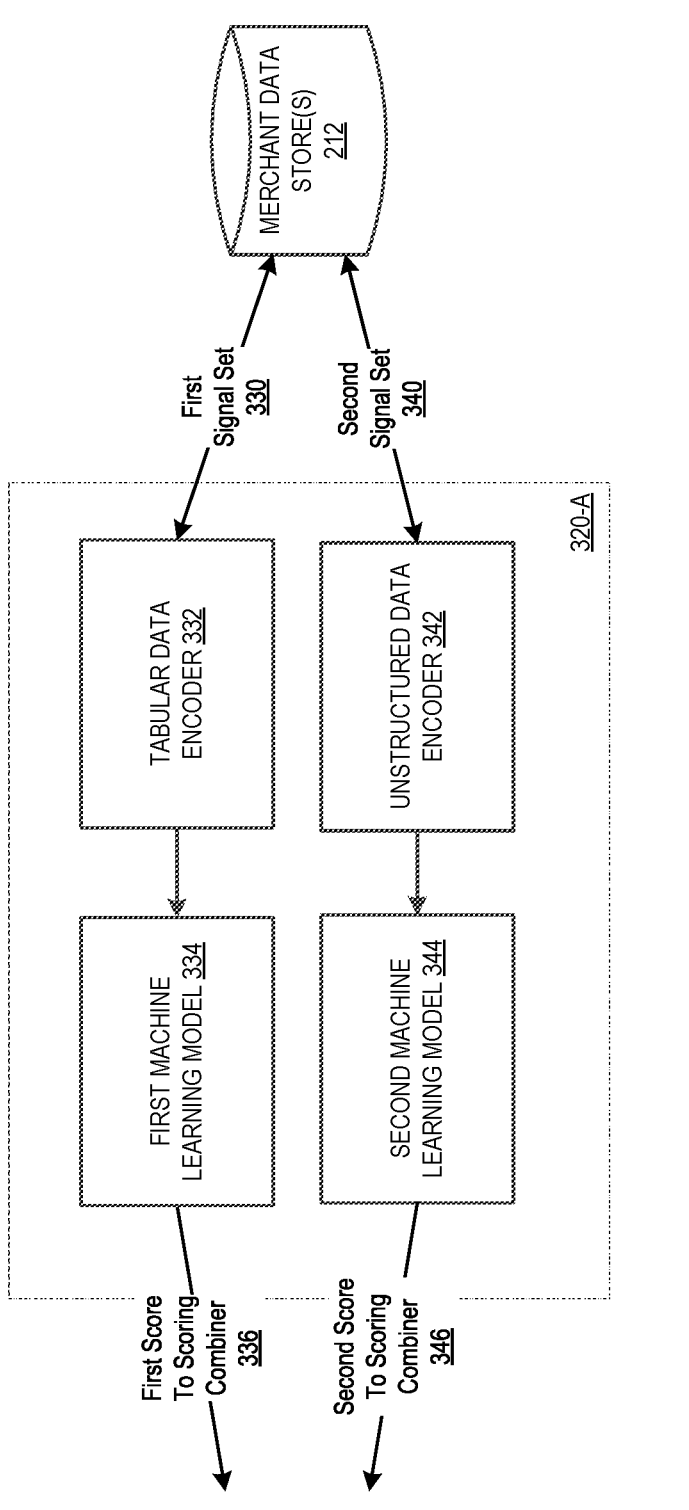
FIG. 3A is a block diagram of one embodiment of encoders and machine learning models of a fraud detection engine of a merchant fraud detection system.
Figure 3B:
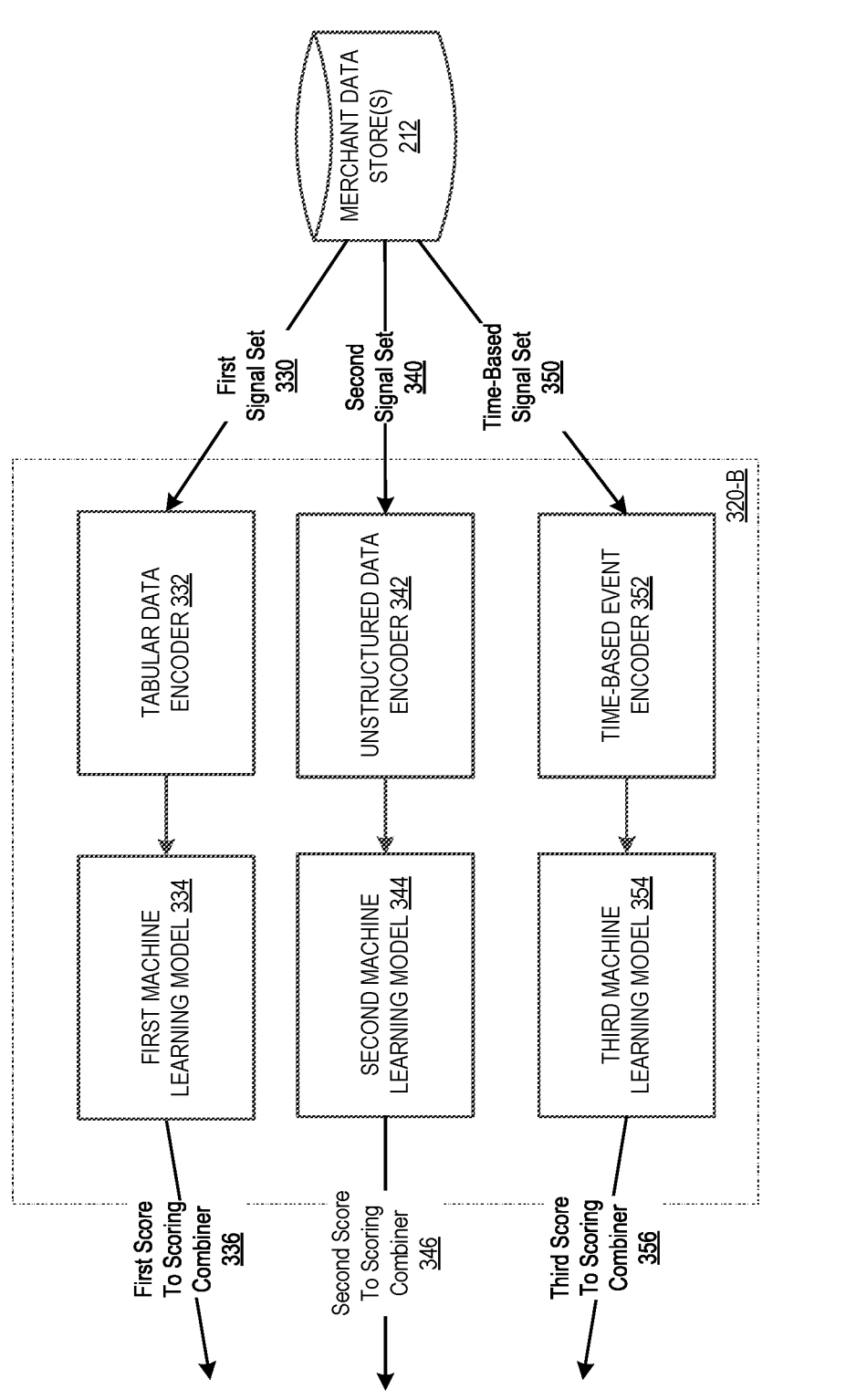
FIG. 3B is a block diagram of another embodiment of encoders and machine learning models of a fraud detection engine of a merchant fraud detection system.
Figure 3C:
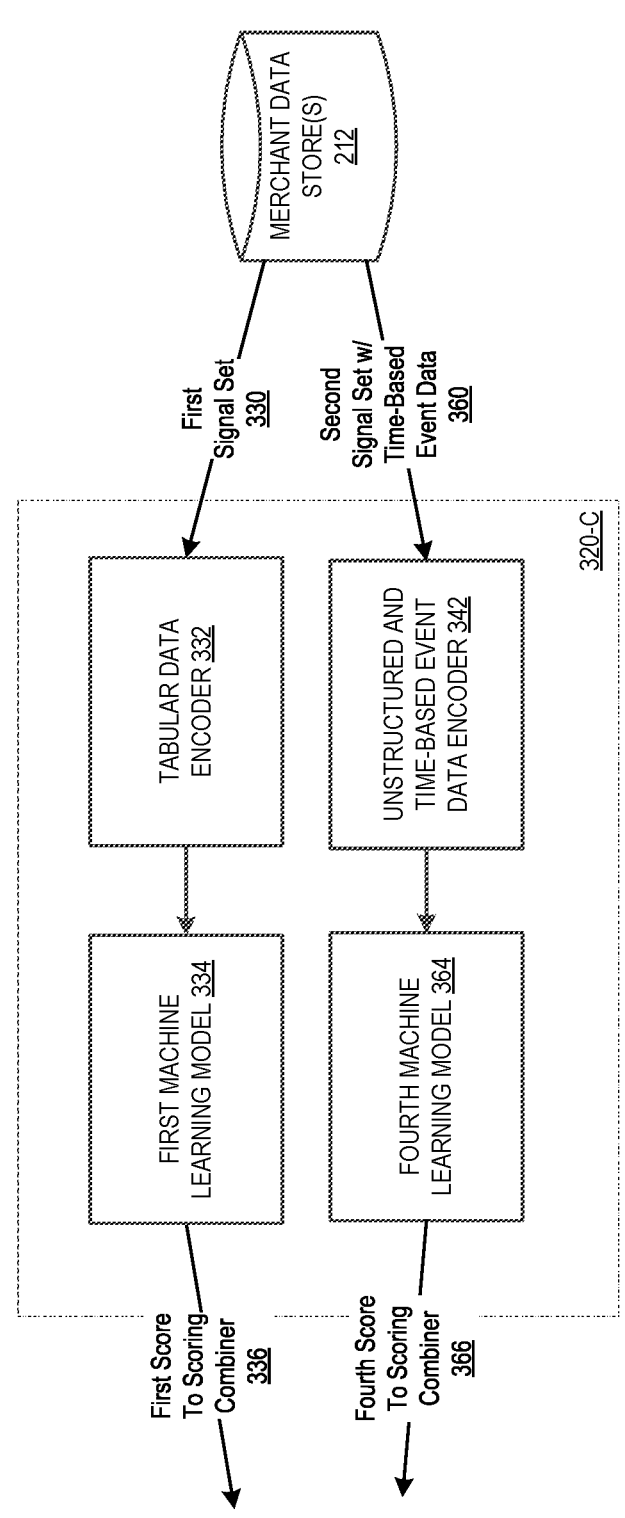
FIG. 3C is a block diagram of another embodiment of encoders and machine learning models of a fraud detection engine of a merchant fraud detection system.

FIGS. 3A-3C illustrates embodiments providing additional details of the MLM input encoder(s) 222 and merchant fraud MLM(s) 224 that form embodiments of the ensembles of MLMs.

As illustrated in FIG. 3A, an ensemble of MLMs and encoders 320-A of fraud detection engine 220, includes a tabular data encoder 332 that takes as input a first signal set from data store 212 (e.g., numerical data such as average transaction amount over a period of time, total transaction amount over a period of time, current transaction amount, total number of declines over a period of time, total number of reversals over a period of time, etc.). The tabular data encoder 332 then encodes the first signal set 330 into an input (e.g., tabular data such as a matrix, vector, etc.) to the first MLM 334. The first MLM may be a MLM that analyzes structured data, such an XG Boost MLM trained to detect fraud from tabular data inputs, as discussed herein. The MLM 334 generates a first score 336 indicative of a likelihood of fraud, which is output to the combiner 226. Furthermore, unstructured data encoder 342 takes a second signal set 340 from data store 212 including a set of unstructured textual data, including for example, an IP address of a transaction, a first name and last name of a merchant system account, a merchant name, an email address, a country associate with the merchant system account, a country associated with the IP address, etc. Encoder 342 may include a transformer model based encoder (e.g., a BERT encoder) that transforms or otherwise modifies the textual data into a standardized form. This standardized form may include concatenating text (e.g., concatenating a first and last name into a single text input), converting text data from original data to a dictionary of potential data (e.g., converting an IP address into one of a range of values), etc. This encoded textual input data may also be combined into a vector, matrix, or other data structure, and fed by encoder 342 into the second MLM 344. The second MLM is trained, as discussed herein, to analyze the set of unstructured data inputs using, for example, a DNN, to detect a likelihood of merchant fraud. A second score 346 generated by the second MLM is then passed to scoring combiner 226.

FIG. 3B illustrates another ensemble of MLMs and encoders 320-B of fraud detection engine 220. The MLMs and encoder 320-B include those illustrated in FIG. 3A discussed above, and further includes a third encoder and MLM, such as time-based event encoder 352 and third MLM 354. Time-based event encoder 352 accesses a time-based event signal set 350 in data store 212 including, for example, API events having associated timing data (e.g., timestamps, system time, ordering data, etc.). Time-based event encoder 352 formats the time-based signal set into a matrix, vector, or other data structure capable of being provided as input to a DNN, CNN, or other appropriate MLM for analyzing time-based data, and trained as discussed herein. For example, each time based event may be translated to a value indicative of the event type and associated with an absolute time value (e.g., a clock or system time) or a relative time value (e.g., an ordering relative to other time-based events). The encoder 352 passes the formatted time-based signal set to the third MLM 354 to generate a third fraud prediction score 356 (e.g., the series of events used to determine a likelihood of a time based attack, such as a distributed attack) which can be provided to combiner 226.

FIG. 3C illustrates another ensemble of MLMs and encoders 320-C of fraud detection engine 220. However, in the embodiment of FIG. 3C, the input signals 340 and 350 of FIG. 3B are combined into a single signal set 360 having both unstructured and time-based event input signals. Similar to the discussion above, encoder 342 transforms and/or formats the signals into a form appropriate for input to a fourth MLM 364. The fourth MLM 364 in the embodiment of FIG. 3C is a single DNN, CNN, etc. that is trained on annotated input data including both unstructured textual data and time data (e.g., IP address, name, email, time-based events, etc.). The fourth MLM 364 generates a fourth score 366 which is provided to combiner 226.

The combination of MLMs in FIG. 3C may be desirable to reduce MLM training and maintenance, as well as to allow for interaction of the unstructured and time-based input signals. However, in other embodiments, retaining model independence as illustrated in FIG. 3B may be desirable to enable tuning of the individual models.

Returning to FIG. 2, scoring combiner 226 receives the set of two or more fraud scores and generates a combined score. In some embodiments, the combined score is a linear average, a weighted average (e.g., giving preference to one MLM score over the others), or some other combination. The combined score, such as the linear average, is then provided to score interpreter 228. Score interpreter compares the combined score to a merchant fraud detection threshold, such that when the combined fraud score meets or exceeds the threshold, merchant fraud is considered to be detected by score interpreter 228. Then the transaction or other merchant system action from which the input data was generated can be identified as fraud.

Remediation engine 230 receives the fraud detection results determined by score interpreter 228 and takes one or more remediative actions via merchant system service(s) processor 204, such as suspending a merchant account, suspending all accounts associated with a fraudulent merchant account, deactivating one or more merchant accounts, blocking a merchant transaction, informing one or more third parties of the detected fraud (e.g., when third party information is collected and/or otherwise attempted to be used in the fraud), as well as other remediative actions.

In some embodiments, remediation engine 230 may further notify an impacted merchant system with the fraud determination, remediative action taken, and an interface for contesting the fraud determination. That is, the merchant system may provide evidence to refute the determination of fraud (such as legitimacy of a blocked transaction, legitimacy of the merchant, evidence that a series of time based events were for a legitimate transaction, etc.). Such evidence may then be reviewed by a human operator and stored with the MLM input data as training data in data store 242. Thus, successful and failed challenges may represent edge cases or close calls, and the contesting, proffer of evidence, and human decision saved as training data for retraining one or more of the MLM(s) 224 by training engine(s) 240. This feedback loop ensures that as the merchant fraud detection system(s) 210 perform more fraud detections that their performing is improved through the feedback and retraining mechanisms of the remediation engine 230, data store 242, and training engine(s) 240.

In some embodiments, score interpreter 228 further receives one or more cohort cluster fraud scores from cluster scoring 234, for which remediative actions are to be taken. In embodiments, in order to generate cohort cluster fraud scores, first merchant cluster processor 232 periodically and asynchronously with one or more transactions accesses merchant data store(s) 212 to access one or more data values indicative of characteristics of each merchant system having an account in merchant data store(s) 212. These characteristics may include data such as transaction processing volume, a total of transactions, a total number of declines, a number of agents associated with a merchant system, a number of accounts associated with a merchant system, geographic origin of a merchant system, as well as other features and/or actions that are descriptive of a merchant system and their activities at the commerce platform system. This information is then analyzed by a clustering algorithm, such as KMeans, density-based spatial clustering, or other clustering technique. The clustering algorithm takes the inputs and groups similar merchant systems together into clusters based on attributes and characteristics of the merchant systems. Thus, a plurality of merchant cohort clusters are formed, where each merchant system may belong to one or more clusters. The clusters may be stored, for example as a data structure, table, etc. where each cluster's members are listed, in data store 212.

Figure 6A:
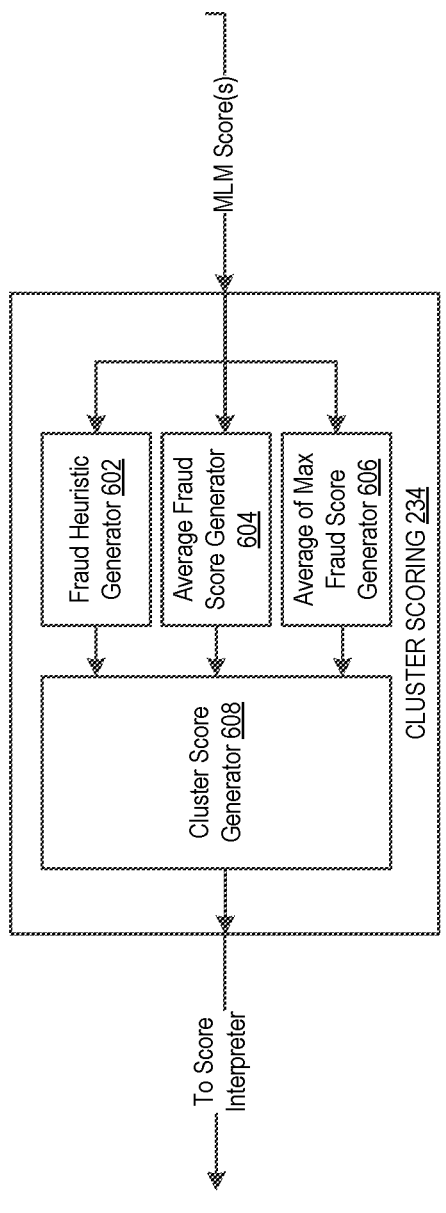
FIG. 6A is a block diagram of one embodiment for cluster scoring by a fraud detection engine of a merchant fraud detection system.

Cluster scoring 234 periodically accesses the clusters to generate cluster fraud scores for each cluster. In embodiments, characteristics of the cluster membership is used to generate a cluster fraud score. As illustrated in FIG. 6A, the cluster fraud score is a combination of one or more scores. For example, cluster scoring takes as input one or more MLM score(s) (e.g., those generated by MLM(s) 224). Fraud heuristic generator 620 generates a fraud heuristic score for each cluster indicative of a total number of merchants for which fraud was detected within a cluster divided by a total number merchant systems within the first cluster meeting a requirement (e.g., processing volume minimum amount, minimum number of transactions, etc.). This heuristic score is indicative of an estimated proportion of merchants associate with fraud in a cluster, and is provided to cluster score generator 608. Average fraud score generator 604 generates an average fraud score value associated with each merchant system within the first cluster (e.g., the average transaction fraud value over all transactions for the merchants within a cluster). This average fraud value may reflect the overall average of fraud detected for merchants (e.g., the fraud predictions both satisfying a merchant system fraud detection threshold and not), which is also provided to cluster score generator 608. Additionally, an average of maximum fraud score generator 606 generates a value being the average of the maximum fraud scores determined for each merchant system within the cluster. That is, for each merchant, the fraud score that is most likely indicative of a fraudulent merchant system is used to generate this average. This average score is also passed to cluster score generator 608. In embodiments, cluster score generator 608 combines the fraud heuristic score, average fraud score, and average maximum fraud scores generated for the cluster. The combination, in embodiments, is the linear average of the three values, but may also be generated based on other combinations, such weighted averages. Furthermore, this scoring is repeated by cluster scoring 234 for each generated cohort cluster so that each cohort cluster is associated with its own cohort cluster fraud score.

Figure 6B:
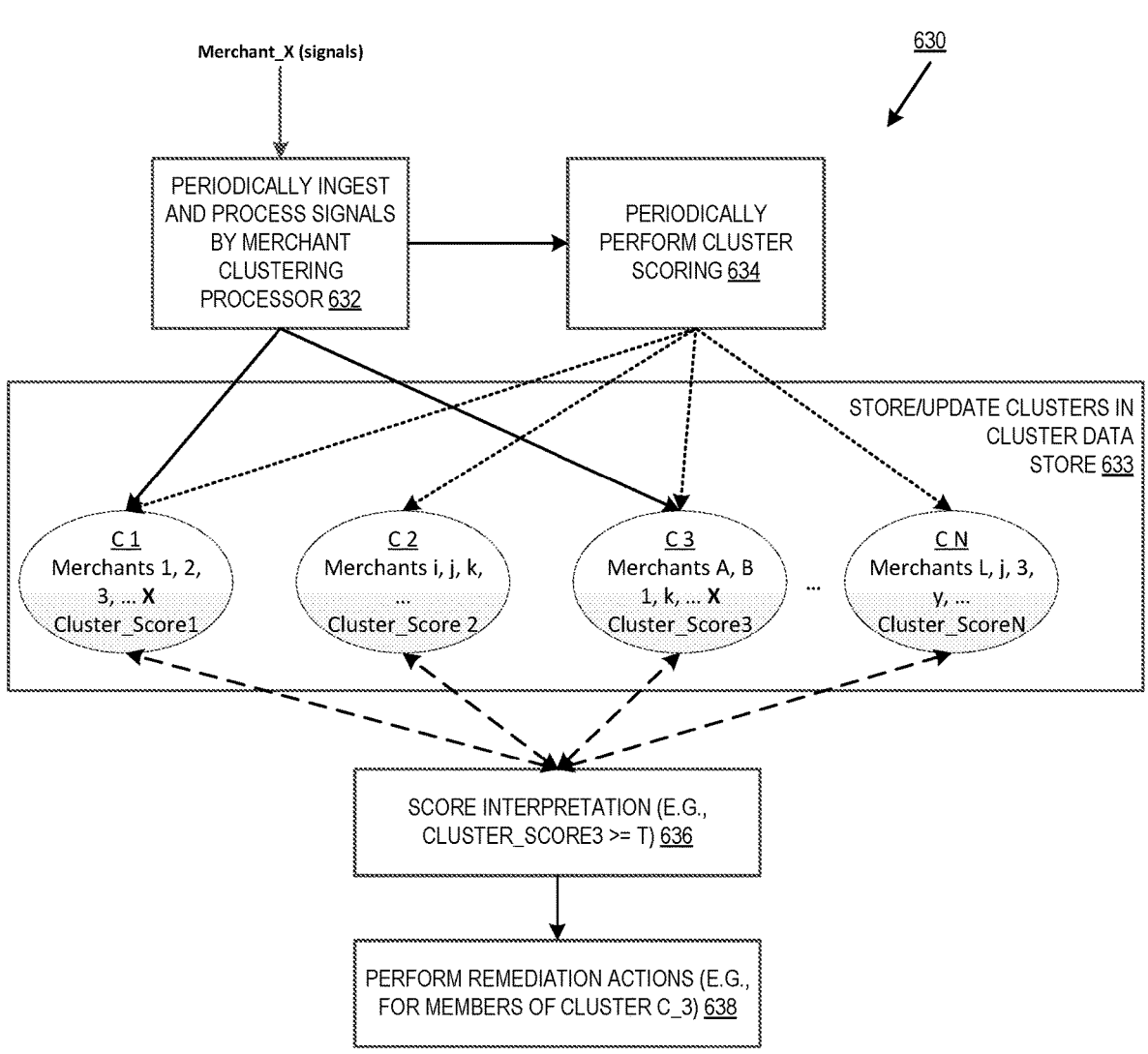
FIG. 6B is a block diagram of one embodiment of a method for using merchant cohort clustering during merchant fraud detection.

In FIG. 6B, an example of a method for clustering and scoring a merchant system within clusters is shown. This method may be performed by software, hardware, firmware or a combination, and may be performed by components of a merchant fraud detection system 210 as discussed herein.

Merchant_X is associated with input signals (e.g., fraud scores for prior transactions, properties of the merchant, etc.), and these input signals may be stored in a merchant data store 212. Merchant clustering processor 632 periodically ingests the signal data 632 for Merchant_X, as well as other merchants (not shown). As discussed above, the signal data used by processor 632 may be encoded signal data, that has formatted, transformed or otherwise modified the signal data into a standardized input vector, matrix, etc. of input values. Thus, clusters C_1, C_2, C_3, through C_N are formed by clustering processor 632, and the cluster assignments of each merchant system to one or more cluster(s) and stored in data store 633. In the example illustrated in FIG. 6B, Merchant_X is assigned by the clustering processor 632 to clusters C_1 and C3. Then periodically, asynchronously with merchant transactions or other requested merchant actions with a commerce platform system, such as every hour, 12 hours, day, week, etc., cluster scoring is performed 634 as discussed above in FIG. 6A, and the generated scores saved with cluster data in data store 633. Score interpreter analyzes each score relative to a merchant fraud threshold 636 to identify when a cluster score (e.g., C_3's cluster_score3>=the fraud threshold) satisfies the cluster fraud detection threshold. When this is detected, remediative actions may be performed on each member of the cluster associated with the cluster fraud score satisfying the fraud detection threshold 638.

Returning to FIG. 2, the cluster fraud scores generated by cluster scoring 234, as discussed in FIGS. 6A and 6B, are provided to score interpreter 228. In embodiments, score interpreter 228 stores the cluster fraud threshold, and compares each cluster's fraud score to the threshold. For each cluster in which the cluster fraud score satisfies the cluster fraud threshold, remediation engine 230 take one or more remediative actions via merchant system service(s) processor 204, as discussed herein, against each member of the cluster for which fraud was detected.

FIG. 4 is a flow diagram of one embodiment of a method 400 for performing merchant fraud detection using an ensemble of machine learning models. The method 400 is performed by processing logic that may comprise hardware (circuitry, dedicated logic, etc.), software (such as is run on a general purpose computer system or a dedicated machine), firmware, or a combination. In one embodiment, the method 400 is performed by a merchant fraud detection system of a commerce platform system (e.g., merchant fraud detection system(s) 112 or 210, and commerce platform system(s) 110 or 202).

Referring to FIG. 4, processing logic begins by accessing a first signal set of merchant system data and a second set of merchant system data, the first set and the second set being different types of merchant system data generated by a merchant system transaction processed by a commerce platform system (processing block 402). As discussed herein, the different signal sets can include different types of data, such as numerical structured data and textual unstructured data, that are indicative of features or characteristics of the present transaction and/or the merchant system. The numerical structured data can include any combination of feature data such as one or more event counts (e.g., number of past fraud detections, number of past transaction declines, number of transactions within a predetermined time period, etc.), current transaction values such as transaction amount, as well as other numerical data associated with a current transaction and/or a history of the merchant system. The textual unstructured data can include, for example, one or more of first name, last name, a merchant name, a doing business as name, an email address, a universal resource locator, an IP address, a country, email domain, location of IP address, as well as other textual data. Additionally, in some embodiments, the textual unstructured data can also include time-based event data, such as an identifier or other data indicative of an API event caused by or during a merchant system transaction, with corresponding timing data for each API event. In some embodiments, both types of textual unstructured data (e.g., time-based and non-time based) may be combined into a single feature signal set. Furthermore, the transaction may be any action to be performed by a commerce platform system by the merchant system, such as processing a financial transaction using a customer's payment information, performing a transaction that establishes an account, performing a transaction that modifies an existing account, performing a transaction that modifies account capabilities, as well as other transactions for which merchant fraud may be detected.

Processing logic encodes each set of merchant system data into corresponding sets of one or more machine learning model input signals (processing block 404). As discussed above, one or more transformations may be applied to each data element, such as a transformation that converts a value or text string into a standardized value, combines text strings (e.g., combines a first and last name), etc. Techniques, such as the BERT natural language processor for transforming text into a predetermined output (e.g., a dictionary of potential output values), parsers that format numerical values, etc. may be used to perform the encoding discussed herein. In embodiments, an input of data values, for example in the form of a vector, matrix, or other data structure, is formed for each MLM which is to be used to analyze transaction and/or merchant system data during a transaction.

Processing logic inputs a first set of input signals into a first machine learning model, and input a second set of input signals into a second machine learning model, the first model and the second model being different types of machine learning models, and each model being separately trained to generate a merchant fraud score based on corresponding different signal types (processing block 406). As discussed herein, the machine learning models are pre-trained based on annotated training data having fraud determinations associated with input signal sets. Then, each MLM is iteratively trained using the annotated training data. Furthermore, as discussed herein, contested and/or other training data generated as a result of fraud determinations may also form training data and fed back into the training process to further improve/refine the MLMs.

Processing logic generate a single merchant fraud score by combining a first merchant fraud score generated by the first machine learning model with a second merchant fraud score generated by the second machine learning model (processing block 408). Each score generated by each MLM is a predicted likelihood of fraud by the respective MLM, and typically is within a range of values (e.g., between 0 indicating no fraud detected and 1 indicating the highest likelihood of fraud being detected). In embodiments, each score is therefore a value between 0 and 1, and can be combined by generating a linear average, a weighted average where one score is considered to be more relevant is given increased weight in the average (e.g., one score is weighted at 0.5 and the other at 1.5), a weighted average based on the confidence of the score (e.g., when a confidence exceeds a predetermined value, such as 0.98, a weighting approach is applied), or other techniques for combining the scores.

Processing logic detects when the single merchant fraud score is indicative of fraudulent activity of the merchant based on a fraud (processing block 410). The detection, in embodiments utilizes a merchant fraud threshold value. This value may be set prior to operation at a predetermined value according to a desired confidence level and/or an acceptable level of risk of obtaining false positive fraud detections.

When the single merchant fraud score satisfies the fraud threshold value (processing block 412), processing logic initiates a remediative action (processing block 412). The remediate action can include one or more actions, such as suspending merchant system account(s), deactivating merchant system account(s), notifying third parties, blocking a current transaction that initiated method 400, selecting a remediative action based on a fraud score (e.g., deactivating an account when a fraud score is a first value and suspending the account when the fraud score is a second, lesser value), as well as other remediative actions. However, when the single merchant fraud score does not satisfy the fraud threshold (processing block 412), the process ends. In embodiments, the fraud detection and remediative action determination is performed in real-time or near real time in line with the transaction requested by the merchant system. Thus, the detection of merchant fraud and potential remediative actions may be taken before the conclusion of the transactions to prevent its completion in the event of fraud.

FIG. 5 is a block diagram of one embodiment of a method 500 for a feedback loop for retraining one or more models in an ensemble of machine learning models. The method 500 is performed by processing logic that may comprise hardware (circuitry, dedicated logic, etc.), software (such as is run on a general purpose computer system or a dedicated machine), firmware, or a combination. In one embodiment, the method 500 is performed by a merchant fraud detection system of a commerce platform system (e.g., merchant fraud detection system(s) 112 or 210, and commerce platform system(s) 110 or 202).

Referring to FIG. 5, processing logic begins by receiving a feedback data on a remediative action performed in response to a merchant fraud detection, The feedback indicative of either a confirmed fraud determination or a confirmed lack of fraud (processing block 502). In embodiments, in response to a fraud determination against a merchant transaction, a merchant system subject to the determination may be given the opportunity to contest the determination. To contest the determination, the merchant system will submit data attempting to prove lack of fraud, for example by responding to a commerce platform system message, uploading feedback data via a web based user interface of the commerce platform system, etc. This feedback data may then be reviewed by, for example, a fraud specialist that can assess whether the feedback data is sufficient to overcome a fraud determination or insufficient. This determination, in embodiments, forms the basis for an annotation of machine learning model training data.

Processing logic annotates a first set of input signals and/or a second set of input signals with the feedback data (processing block 504). That is, when the fraud specialist makes a decision on the fraud determination, the decision can be added as the annotation to the data from which the fraud determination was generated. This can include the structured and unstructured data sets discussed above. Then, when combined with the annotation, the data set(s) and annotations may be used as MLM retraining data. Processing logic stores the annotated first set of input signals and/or second set of input signals in a training data store (processing block 506).

Processing logic then periodically retrains the one or more machine learning models based, at least in part on annotated data representing past document fraud detection (processing block 508). In some embodiments, the periodic retraining includes a plurality of annotated training data representing verified correct and/or verified incorrect fraud determinations. At regular time intervals, in response to obtaining a predetermined quantity of training data, or in response to other retraining condition(s), processing logic can perform the retraining of processing block 508.

Figure 7:
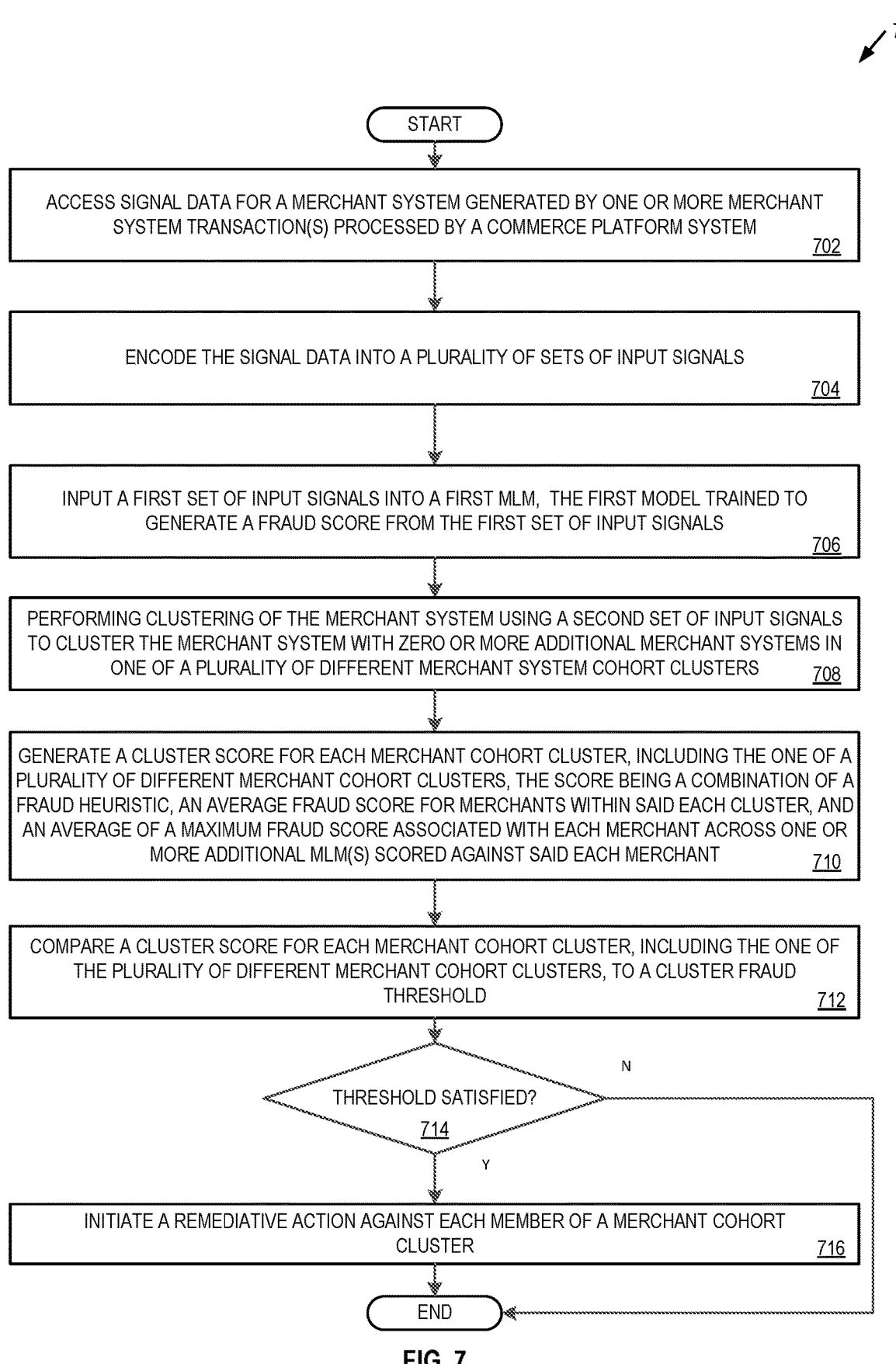
FIG. 7 is a flow diagram of one embodiment of a method for performing fraud detection using merchant clustering.

FIG. 7 is a flow diagram of one embodiment of a method 700 for performing fraud detection using merchant clustering. The method 700 is performed by processing logic that may comprise hardware (circuitry, dedicated logic, etc.), software (such as is run on a general purpose computer system or a dedicated machine), firmware, or a combination. In one embodiment, the method 700 is performed by a merchant fraud detection system of a commerce platform system (e.g., merchant fraud detection system(s) 112 or 210, and commerce platform system(s) 110 or 202).

Referring to FIG. 7, processing logic begins by accessing signal data for a merchant system generated by one or more merchant system transaction(s) processed by a commerce platform system (processing block 702). In embodiments, the signal data may include one or more set of signal data as discussed above. Processing logic encodes the signal data into a plurality of sets of input signals (processing block 704). The sets of input signals correspond with, for example, one or more sets of MLM input signal sets indicative of features analyzed by one or more MLMs. The sets of input signals can further includes transformed unstructured data used for clustering, as discussed above. In embodiments, the accessing is performed periodically and asynchronously with transactions, such as on an hourly, daily, weekly, etc., basis.

Processing logic then inputs a first set of input signals into a first MLM, the first model trained to generate a fraud score from the first set of input signals (processing block 706). The first MLM, in embodiments, may be a single MLM or an ensemble of MLMs, such as any combination of the MLMs discussed above.

Processing logic then performs clustering of the merchant system using a second set of input signals to cluster the merchant system with zero or more additional merchant systems in one of a plurality of different merchant system cohort clusters (processing block 708). In embodiments, the cluster seeks to group merchants having sufficiently similar characteristics into various groupings, referred to herein as cohort clusters. That is the merchant is grouped with its cohorts based on a similarity of the features in the second set of input signals. To achieve this clustering, as discussed herein, a KMeans or density-based spatial clustering technique is used by processing logic.

Following clustering, processing logic generates a cluster score for each merchant cohort cluster, including the one of a plurality of different merchant cohort clusters, the score being a combination of a fraud heuristic, an average fraud score for merchants within said each cluster, and an average of a maximum fraud score associated with each merchant across one or more additional MLM(s) scored against said each merchant (processing block 708). As discussed above, the fraud heuristic is a score based on a number of merchant systems in a cluster for which fraud is detected divided by a total number of merchants for which fraud was not detected. The average fraud score value is a value indicating average fraud scores as determined by one or more MLMs, such as the first MLM from which the fraud score was generated. This fraud score may then be used when determining the average fraud score value. In embodiments, an average of maximum fraud scores may also be calculated for the members of a cluster to provide an average of max fraud scores. Thus, these values represent values indicative of a proportion of fraudulent merchants in a cluster, an average fraud score, and an average of maximum fraud scores. In embodiments, these scores may be combined, for example using a linear average, or any of the other combination techniques discussed above.

Processing logic further compares a cluster score for each merchant cohort cluster, including the one of the plurality of different merchant cohort clusters, to a cluster fraud threshold (processing block 710). Thus, after each cluster score is generated, the scores of each cluster are compared to a cluster fraud threshold. This cluster fraud threshold may be set, for example by a commerce platform system, based on a desired fraud detection threshold.

When the cluster score satisfies the cohort cluster fraud threshold (processing block 712), processing logic can initiate one or more remediative actions against each member of the merchant cohort cluster (processing block 714). The remediative actions may include any combination of those discussed herein, and are performed against all members of a cluster. For example, if it is determined that a first fraudulent cluster is subject to account suspension, each merchant system assigned to the cluster will have its account suspended by the commerce platform systems(s). Similarly, if it is determined that a second fraudulent cluster is subject to account deactivation, each merchant system associated to the second cluster will have their respective accounts deactivated. In embodiments, as discussed herein, the remediative action is selected based on a fraud score with more probably fraud scores associated with more sever remediative actions. In some embodiments, the same merchant system may be assigned to different cohort clusters, and may therefore have multiple remediative actions taken against it. In other embodiments, a merchant system subject to multiple remediative actions will have a single action (e.g., the one that is most severe) performed against it. However, When the cluster score does not satisfy the cohort cluster fraud threshold (processing block 712), the process ends.

In the embodiments discussed herein, the merchant fraud detection ensures accurate detection of different kinds of merchant fraud. Furthermore, the detection may be achieved even though the commerce platform system perform the detection, and merchant systems performing various actions using the commerce platform system are remote system exchanging communications, messages, API commands, etc. over a network. Thus, the merchant fraud detection discussed above addresses the challenges of how to perform such fraud detection using only the remote interactions by using various ensembles of machine learning models and processes trained and deployed as discussed herein to detect fraud in both real time to stop fraudulent transactions before they may be completed, and also asynchronously to detect other fraudulent merchants that are not detected form their respective transactions. Additionally, the machine learning models are retrained over time based in part on feedback from actual fraud determinations to achieve improved fraud detection performance by improving the models used to make the fraud determinations.

Figure 8:
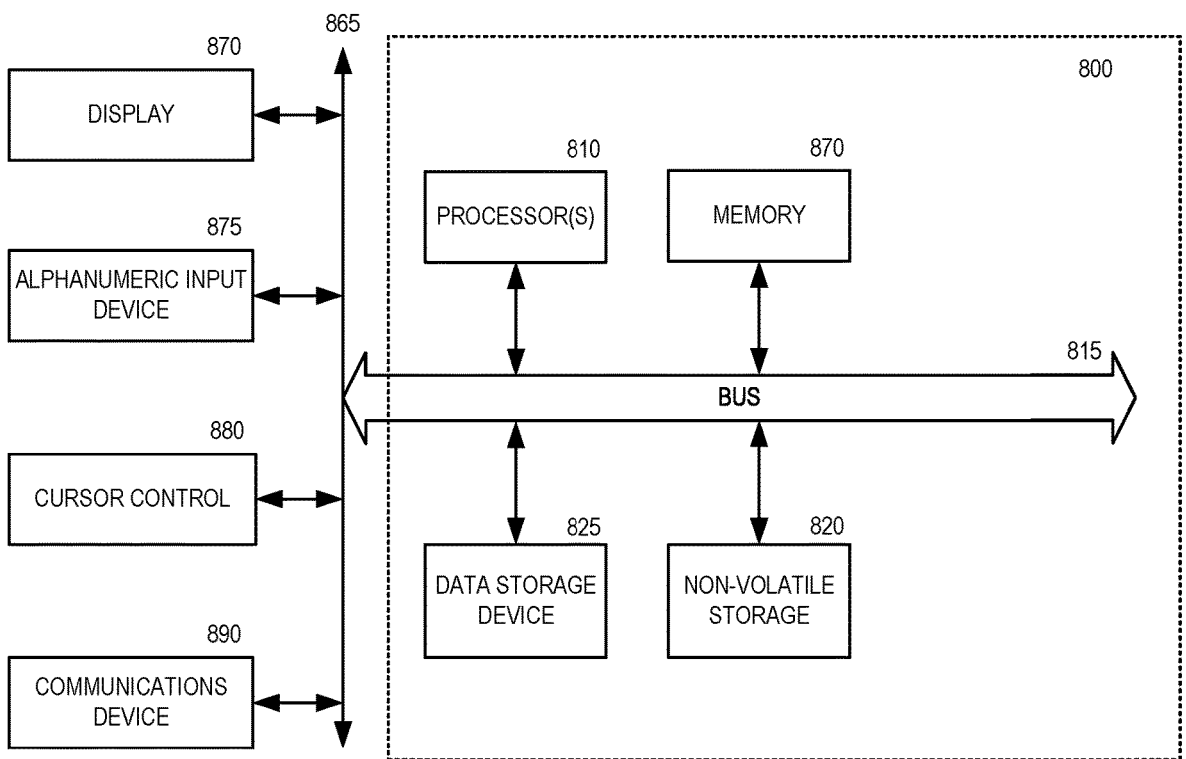
FIG. 8 is one embodiment of a computer system that may be used to support the systems and operations discussed herein.

FIG. 8 is one embodiment of a computer system that may be used to support the systems and operations discussed herein. For example, the computer system illustrated in FIG. 8 may be used by a commerce platform system, a merchant development system, merchant user system, etc. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for detecting fraudulent activities at a server computer system, the method comprising:

accessing, by a processor of the server computer system, a first set of user system data generated for a user system service request being processed by the server computer system;

encoding, by the processor of the server computer system, the first set of user system data into a set of structured data input signals;

accessing, by the processor of the server computer system, a set of time based data associated with a set of application programming interface (API) events performed by distributed service processing systems of the server computer system that are initiated by or performed in response to, the user system service request, wherein each API event is associated with timing data;

encoding, by the processor of the server computer system, the set of time based data into a set of unstructured time-based data input signals, wherein each unstructured time-based input signal in the set of unstructured time-based data input signals comprises an identifier of one of the set of API events and a relative time value, the relative time value encoded as a transformation of timing data associated with the one of the set of API events to a relative time value of the one of the set of API events relative to a second one of the set of API events;

inputting, by the processor of the server computer system, the set of structured data input signals into a first machine learning model, and inputting, by the processor of the server computer system, the set of unstructured data input signals into a second machine learning model, the first machine learning model trained to detect fraudulent activities from structured data input signals and the second machine learning model trained to detect fraudulent activities based on relative timing of API events performed by the distributed service processing systems of the server computer system in the unstructured time-based data input signals;

generating, by the processor of the server computer system, a single fraud score by combining a first fraud score generated by the first machine learning model with a second cant fraud score generated by the second machine learning model; and in response to detecting that the single fraud score satisfies a fraud detection threshold, initiating, by the processor of the server computer system, one or more remediative actions against the user system service request, a user system, or a combination thereof;

wherein initiating the one or more remediative actions comprises:

sending, by the processor of the server computer system, a fraud detection message to the user system with data indicative of the single fraud score, receiving, by the processor of the server computer system, from the user system, feedback data indicative of lack of fraud by the user system with respect to the user system service request, and annotating, by the processor of the server computer system, the set of structured data input signals and the set of unstructured data input signals with the feedback data as annotated service request data.

2. The method of claim 1, wherein the first machine learning model comprises an XGBoost machine learning model, and the second machine learning model comprises a Neural Network machine learning model.

3. The method of claim 1, wherein the set of structured data input signals is tabular numeric data that comprises one or more of an amount associated with the user system service request, a total number of service requests associated with the user system, a number of declines associated with the user system, and a number of fraud detections associated with the user system.

4. The method of claim 1, wherein generating the single fraud score by combining the first fraud score generated by the first machine learning model with the second fraud score generated by the second machine learning model, comprises:

calculating, by the processor of the server computer system, an average of the first fraud score and the second fraud score, wherein the average forms the single fraud score.

5. The method of claim 4, further comprising:

accessing, by the processor of the server computer system, a third set of user system data, the third set of user system data being different from the first and second sets, and the third set of user system data comprising a set of unstructured text data;

encoding, by the processor of the server computer system, unstructured set of text data into a set of unstructured text data input signals using a transformer machine learning model, the transformer machine learning model translating the unstructured set of text data into the set of unstructured text data input signals based on a dictionary of values;

inputting, by the processor of the server computer system, the second set of unstructured data input signals into a third machine learning model trained to detect fraudulent activities from unstructured text data input signals;

generating, by the processor of the server computer system, the single fraud score by combining a third fraud score generated by the third machine learning model with the first fraud score generated by the first machine learning model and the second fraud score generated by the second machine learning model; and calculating, by the processor of the server computer system, the average of the first fraud score, the second fraud score, and the third fraud score, wherein the average forms the single fraud score.

6. The method of claim 5, wherein the second machine learning model and the third machine learning model are a single machine learning model, wherein the set of unstructured text data input signals and the set of unstructured time-based data input signals are combined into a single set of unstructured data input signals, and wherein the single machine learning model is trained to detect fraudulent activity based on data input signals corresponding to the single set of unstructured data input signals.

7. The method of claim 1, wherein initiating the one or more remediative actions, further comprises:

declining, by the processor of the server computer system, the user system service request;

deactivating, by the processor of the server computer system, an account associated with the user system; or a combination thereof.

8. The method of claim 1, wherein initiating the one or more remediative actions, further comprises:

storing, by the processor of the server computer system, the annotated service request data in a training data store.

9. The method of claim 1, further comprising:

periodically retraining, by the processor of the server computer system, the first machine learning model and the second machine learning model based, at least in part, on the set of annotated training data.

10. The method of claim 1, wherein the single fraud score is generated in real time or near real time, and an analysis of the single fraud score based on the fraud detection threshold occurs prior to processing the user system service request.

11. The method of claim 1, wherein the user system service request comprises one of: the establishment of a user account at the server computer system, a card based service request initiated by the user system, or a service request initiated by an agent of the user system.

12. A non-transitory computer readable storage medium storing instructions, which when executed by a server computer system that comprises a memory and a processor, causes the processor of the server computer system to perform operations for detecting fraudulent activities at the server computer system, the operations comprising:

accessing a first set of user system data generated for a user system service request being processed by the server computer system;

encoding the first set of-user system data into a set of structured data input signals;

accessing a set of time based data associated with a set of application programming interface (API) events performed by distributed service processing systems of the server computer system that are initiated by, or performed in response to, the user system service request, wherein each API event is associated with timing data;

encoding the set of time based data into a set of unstructured time-based data input signals, wherein each unstructured time-based input signal in the set of unstructured time-based data input signals comprises an identifier of one of the set of API events and a relative time value, the relative time value encoded as a transformation of timing data associated with the one of the set of API events to a relative time value of the one of the set of API events relative to a second one of the set of API events;

inputting the set of structured data input signals into a first machine learning model, and inputting the set of unstructured data input signals into a second machine learning model, the first machine learning model trained to detect fraudulent activities from structured data input signals and the second machine learning model trained to detect fraudulent activities based on relative timing of API events performed by the distributed service processing systems of the server computer system in the unstructured time-based data input signals;

generating a single fraud score by combining a first fraud score generated by the first machine learning model with a second fraud score generated by the second machine learning model; and in response to detecting that the single fraud score satisfies a fraud detection threshold, initiating one or more remediative actions against the user system service request, a user system, or a combination thereof;

wherein initiating the one or more remediative actions comprises:

sending a fraud detection message to the user system with data indicative of the single fraud score, receiving, from the user system, feedback data indicative of lack of fraud by the user system with respect to the user system service request, and annotating the set of structured data input signals and the set of unstructured data input signals with the feedback data as annotated service request data.

13. The non-transitory computer readable storage medium of claim 12, wherein the first machine learning model comprises an XGBoost machine learning model, and the second machine learning model comprises a Neural Network machine learning model.

14. The non-transitory computer readable storage medium of claim 12, wherein initiating the one or more remediative actions, further comprises:

storing the annotated service request data in a training data store.

15. The non-transitory computer readable storage medium of claim 12, wherein the operations further comprise:

periodically retraining the first machine learning model and the second machine learning model using, at least in part, the annotated service request data.

16. The non-transitory computer readable storage medium of claim 12, wherein generating the single fraud score by combining the first fraud score generated by the first machine learning model with the second fraud score generated by the second machine learning model, comprises:

calculating an average of the first fraud score and the second fraud score, wherein the average forms the single fraud score.

17. The non-transitory computer readable storage medium of claim 16, wherein the operations further comprise:

accessing a third set of user system data, the third set of user system data being different from the first and second sets, and the third set of user system data comprising a set of unstructured text data;

encoding unstructured set of text data into a set of unstructured text data input signals using a transformer machine learning model, the transformer machine learning model translating the unstructured set of text data into the set of unstructured text data input signals based on a dictionary of values;

inputting the second set of unstructured data input signals into a third machine learning model trained to detect fraudulent activities from unstructured text data input signals;

generating the single fraud score by combining a third fraud score generated by the third machine learning model with the first fraud score generated by the first machine learning model and the second fraud score generated by the second machine learning model; and calculating the average of the first fraud score, the second fraud score, and the third fraud score, wherein the average forms the single fraud score.

18. The non-transitory computer readable storage medium of claim 17, wherein the second machine learning model and the third machine learning model are a single machine learning model, wherein the set of unstructured text data input signals and the set of unstructured time-based data input signals are combined into a single set of unstructured data input signals, and wherein the single machine learning model is trained to detect fraudulent activity based on data input signals corresponding to the single set of unstructured data input signals.

19. A server computer system for detecting fraudulent merchant activities at a commerce platform system, the server computer system comprising:

a memory that stores one or more instructions; and one or more processors coupled with the memory configured to execute the one or more instructions causing the one or more processors to perform operations, comprising:

accessing a first set of user system data generated for a user system service request being processed by the server computer system;

encoding the first set of user system data into a set of structured data input signals;

accessing a set of time based data associated with a set of application programming interface (API) events performed by distributed service processing systems of the server computer system that are initiated by, or performed in response to, the user system service request, wherein each API event is associated with timing data;

encoding the set of time based data into a set of unstructured time-based data input signals, wherein each unstructured time-based input signal in the set of unstructured time-based data input signals comprises an identifier of one of the set of API events and a relative time value, the relative time value encoded as a transformation of timing data associated with the one of the set of API events to a relative time value of the one of the set of API events relative to a second one of the set of API events;

inputting the set of structured data input signals into a first machine learning model, and inputting the set of unstructured data input signals into a second machine learning model, the first machine learning model trained to detect fraudulent activities from structured data input signals and the second machine learning model trained to detect fraudulent activities based on relative timing of API events performed by the distributed service processing systems of the server computer system in the unstructured time-based data input signals;

generating a single fraud score by combining a first fraud score generated by the first machine learning model with a second fraud score generated by the second machine learning model; and in response to detecting that the single fraud score satisfies a fraud detection threshold, initiating one or more remediative actions against the user system service request, a user system, or a combination thereof;

wherein initiating the one or more remediative actions comprises:

sending a fraud detection message to the user system with data indicative of the single fraud score, receiving, from the user system, feedback data indicative of lack of fraud by the user system with respect to the user system service request, and annotating the set of structured data input signals and the set of unstructured data input signals with the feedback data as annotated service request data.

* * * * *